(12) United States Patent
Dellow

(10) Patent No.: US 9,246,687 B2
(45) Date of Patent: Jan. 26, 2016

(54) METHOD FOR AUTHORIZING AND AUTHENTICATING DATA

(75) Inventor: Andrew Dellow, Minchinhampton (GB)

(73) Assignee: Broadcom Corporation, Irvine, CA (US)

(*) Notice: Subject to any disclaimer, the term of this patent is extended or adjusted under 35 U.S.C. 154(b) by 1686 days.

(21) Appl. No.: 12/038,509

(22) Filed: Feb. 27, 2008

(65) Prior Publication Data

US 2008/0267410 A1 Oct. 30, 2008

Related U.S. Application Data

(60) Provisional application No. 60/903,846, filed on Feb. 28, 2007.

(51) Int. Cl.
*H04L 9/08* (2006.01)
*H04L 9/32* (2006.01)

(52) U.S. Cl.
CPC .......... *H04L 9/3247* (2013.01); *H04L 2209/38* (2013.01)

(58) Field of Classification Search
CPC ........................................................ H04L 9/32
USPC ............................................. 705/59; 707/100
See application file for complete search history.

(56) References Cited

U.S. PATENT DOCUMENTS

| | | | | |
|---|---|---|---|---|
| 5,917,910 A * | 6/1999 | Ishiguro et al. | ................ | 705/57 |
| 5,933,497 A * | 8/1999 | Beetcher et al. | ................ | 705/59 |
| 6,108,425 A * | 8/2000 | Smith et al. | ................ | 380/277 |
| 6,381,696 B1 * | 4/2002 | Doyle | ................ | 713/156 |
| 6,662,151 B1 * | 12/2003 | Schaefer-Lorinser | ........ | 713/185 |
| 7,933,410 B2 * | 4/2011 | Fahrny | ................ | 380/201 |
| 2002/0019814 A1 * | 2/2002 | Ganesan | ................ | 705/59 |
| 2002/0059286 A1 * | 5/2002 | Challener | ................ | 707/100 |
| 2002/0118674 A1 * | 8/2002 | Faccin et al. | ................ | 370/352 |
| 2003/0026428 A1 * | 2/2003 | Loisel | ................ | 380/277 |
| 2003/0097579 A1 * | 5/2003 | England et al. | ................ | 713/193 |
| 2003/0135746 A1 * | 7/2003 | Abbott et al. | ................ | 713/193 |
| 2004/0003251 A1 * | 1/2004 | Narin et al. | ................ | 713/172 |
| 2004/0020744 A1 * | 2/2004 | Blum | ................ | 194/202 |
| 2004/0088541 A1 * | 5/2004 | Messerges et al. | ........... | 713/156 |
| 2004/0111331 A1 * | 6/2004 | Yano et al. | ................ | 705/26 |
| 2004/0181469 A1 * | 9/2004 | Saeki | ................ | 705/30 |
| 2004/0205028 A1 * | 10/2004 | Verosub et al. | ................ | 705/59 |
| 2004/0243682 A1 * | 12/2004 | Markki et al. | ................ | 709/207 |
| 2005/0005112 A1 * | 1/2005 | Someren | ................ | 713/167 |
| 2006/0059342 A1 * | 3/2006 | Medvinsky et al. | .......... | 713/168 |
| 2007/0094736 A1 * | 4/2007 | Kitahara et al. | ................ | 726/26 |
| 2007/0172066 A1 * | 7/2007 | Davin | ................ | 380/262 |
| 2007/0223706 A1 * | 9/2007 | Gantman et al. | ............. | 380/286 |
| 2008/0069347 A1 * | 3/2008 | Brown et al. | ................ | 380/45 |
| 2011/0289318 A1 * | 11/2011 | Zhang et al. | ................ | 713/176 |
| 2012/0166666 A1 * | 6/2012 | Tollet et al. | ................ | 709/230 |

FOREIGN PATENT DOCUMENTS

FR 2949934 A1 * 3/2011

* cited by examiner

*Primary Examiner* — Andrew Goldberg
(74) *Attorney, Agent, or Firm* — Sterne, Kessler, Goldstein & Fox P.L.L.C.

(57) ABSTRACT

A method and a corresponding apparatus for authenticating data in a digital processing system (DPS) is disclosed, wherein a root/first tier key pair associated with a first tier/root authority may sign data and second tier keys for authorizing data for processing in the DPS. The first tier/root authority may pass entitlements to the authorized second tier key, which may itself authorize third tier keys and pass entitlements to said key.

23 Claims, 1 Drawing Sheet

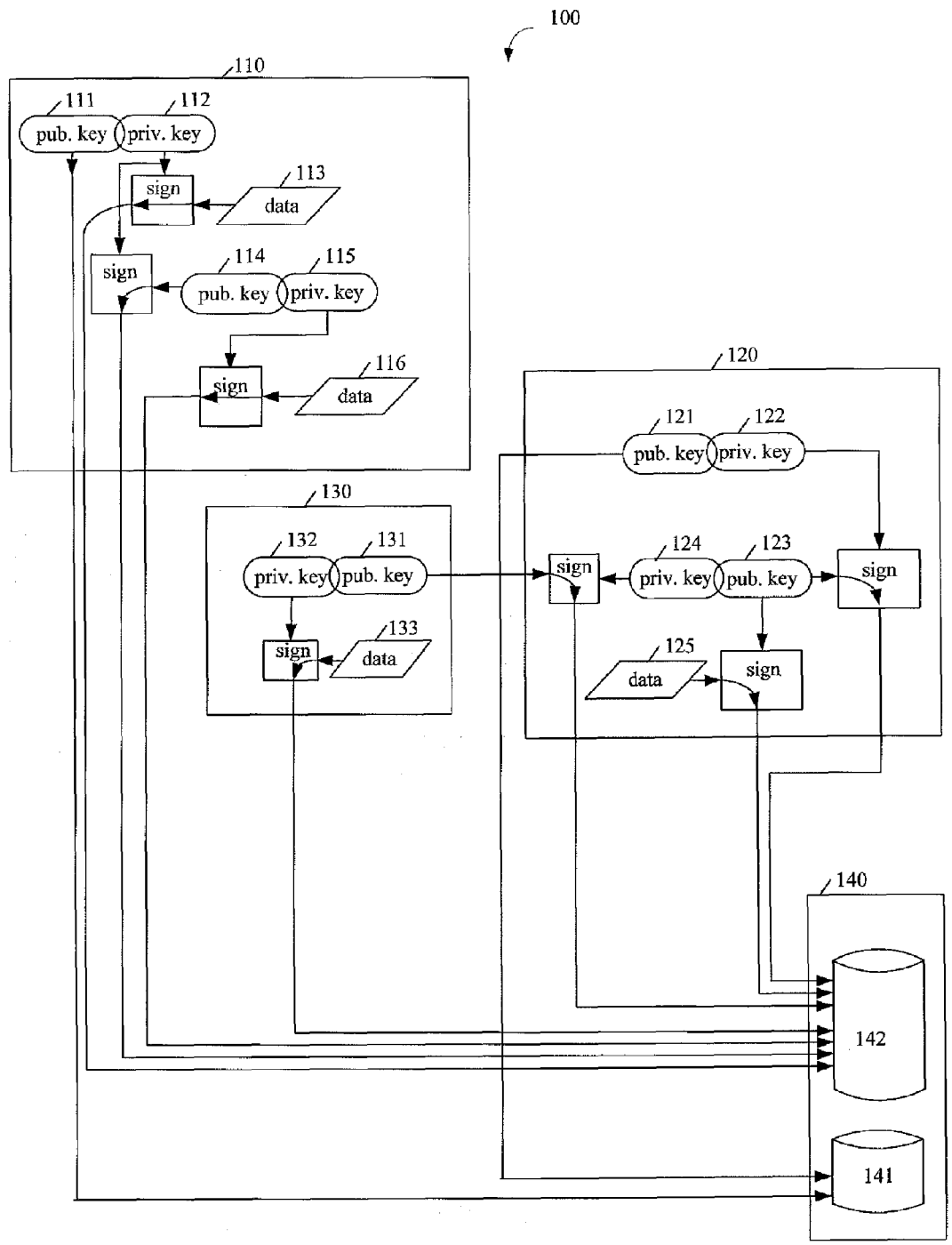

METHOD FOR AUTHORIZING AND AUTHENTICATING DATA

CROSS-REFERENCE TO RELATED APPLICATIONS

This application claims the benefit of U.S. Provisional Application No. 60/903,846, filed on Feb. 28, 2007, entitled "Mechanism for Configuring Dual Asymmetric Key Chains", which is incorporated by reference in its entirety herein.

FIELD OF THE INVENTION

The invention relates to methods and a corresponding apparatus for authorizing and authenticating data in a digital processing system.

BACKGROUND OF THE INVENTION

Some electronic devices are designed to operate according to entitlements given to these devices. For example settop boxes for receiving and in particular decrypting an encrypted data stream representing a pay TV channel need to have means for decrypting the stream. These entitlements may also allow or disallow certain uses of the content of the stream, such as recording or export. The control for this entitlement is often processed by a general purpose CPU.

Mostly electronic devices of this kind incorporate integrated circuits, which integrate all or nearly all components of a computer or an electronic system into one single integrated circuit, so called system on chip (SOC). Accordingly the functions of said electronic devices are represented by the comprised SOCs.

In many cases the SOCs in an electronic device are not application specific, hence their function is defined by the software provided to the SOCs. In order to control the content to be processed according to the entitlements the corresponding software or data must be transferred to the SOCs or digital processing system (DPS). In the following description the term Digital Processing System abbreviated as DPS is used.

To further simplify the wording in the following description the term data may mean executable code, i.e. program code executable in a processor, as well as non-executable binary data, which is to be processed in a processor using a piece of executable program code already present in the processor. Non-executable data for example may be configuration data, which for example may enable or disable functions in the DPS or which may set or unset properties in the DPS or which may be any other information used by the DPS.

Software can be easily copied and distributed among devices without any loss in quality. Accordingly a data stream stored on a storage media can be multiplied and easily distributed, thereby producing copies of the streamed data. However manufacturers or providers of special services, like pay TV providers for example, need a method to ensure that only authorized software can be executed on DPSs, such that the software will correctly enforce the entitlements for processing a received data stream.

One method to ensure that authorized software only is executed by the processor of a DPS is to include a security system that checks for a signature, i.e. a digital signature, of the code or data before it is processed in the processor of the DPS.

A digital signature of data is used to provide authentication of said data. In a conventional digital signature scheme, for example known from a public key infrastructure PKI, a pair of keys, i.e. a private key and a public key, is used to generate and check digital signatures. The digital signature is produced by a signing algorithm on input of the data and a signing key, i.e. the private key. The signing algorithm for example applies a hash function to compute a unique signature from the data and the private key. The digital signature, which is also digital information, may be sent to a recipient together with the data. As the public key of the key pair is publicly available, the recipient may use it. The signature of the data can be verified or checked at the recipient's end by a signature verifying algorithm, that on input of the data and a verifying key, i.e. the public key of the key pair, outputs either that the signature is valid or invalid. If the signature is valid then the signature has been computed using the private key associated with the used public key. That is, when ownership of the private key is bound to a specific user or authority, then a valid signature shows that the data was sent by that user or authority. Furthermore the valid signature ensures that the data have not been amended after the signature was computed.

So by checking a signature associated with the data in question the recipient can check, i.e. authenticate, that the data was sent by the owner of the private key and is the original data. However the recipient must have the public key of the sender and furthermore must be sure that the used key actually is that of the sender.

Data, which for example may be the executable program code, in this way may be signed by an authority. The authority approves by its signature that the data or code has been authorized. That is the authority has approved that the data may be processed in the DPS, i.e. the executable code may be executed in a processor or non-executable data may be processed in a processor using a program running on the processor.

When the data in question is transferred to the DPS the security system in the DPS checks for a signature of the data before the data is processed in the DPS. That is the security system in the DPS uses the public key of the authority to check the validity of the signature. The public key used for checking the signature is stored in the memory of the DPS. In order to prevent fraud attempts on the public key, which a user of a settop box may try for example by replacing a key by his own public key thus making himself an authorizing authority, the public key may be hard coded in the DPS, for example by using one time programmable memory, which cannot be changed once written, or by Read Only Memory, set at manufacturing time. So any data provided to the DPS for execution or processing is checked for a valid signature, wherein the public key ensures that the signature was calculated using the secret key corresponding to the hard coded public key. Accordingly only the owner of the pair of public and secret key is capable of calculating a signature and is thus capable of authorizing software or data to be executed or processed by a DPS.

This system assumes, that each data to be processed in the DPS is signed by the signing authority. Accordingly when a new or updated piece of executable code or configuration data is to be processed by the DPS, then the signing authority has to calculate the signature, which must be transferred to the DPS in order to allow the processing in the DPS. This may cause the signing authority to sign data, of which it does not have real knowledge. For example when the signing authority is a pay TV provider, who authorizes the execution of decryption software in a DPS for decrypting a pay TV channel. As usually the pay TV provider will not produce the settop boxes for decrypting the channel, but a third party will produce the settop boxes and the software executed therein. Whenever software in the settop box is to be updated the provider has to authorize the updated software before transferring the updated release to a settop box. The pay TV provider usually will trust the producer of the settop box and accordingly will sign the updated data. There may be other situations, in which a signing authority actually will not have real knowledge about the data to be transferred to the settop box. So there may be situations, where the signing authority will have to trust the producer of the data and thus simply sign data items to allow the settop box, i.e. the SOC within the settop box, to process the data, because due to the amount and complexity of this data it is practically impossible to examine the data thoroughly.

Consequently a more flexible method for authorizing and authenticating software and data before execution or processing is desirable. For example such that a manufacturer of a DPS can sign its own data items, wherein the manufacturer is restricted to sign data items depending on the particular system, the security provider.

BRIEF SUMMARY OF THE INVENTION

A method for authenticating data to be processed in a digital processing system is disclosed, comprising the steps of generating a first tier key comprising a first tier public key portion and a first tier private key portion and transferring the first tier public key portion to the digital processing system, generating a second tier key comprising a second tier public key portion and a second tier private key portion, authorizing the second tier key by the first tier key producing a signature of the second tier key and transferring the second tier public key portion and the associated signature to the digital processing system, and authenticating the second tier public key portion using the first tier public key portion.

A corresponding apparatus accordingly relates to a digital processing system comprising a first tier public key portion, wherein the system is adapted and configured for receiving a second tier public key portion and an associated digital signature and authenticating the second tier public key portion using the first tier public key portion.

Furthermore the method may comprise the steps of generating a first key known as a root key comprising a root public key portion and a root private key portion, transferring the root public key portion and a digital representation of associated entitlements to the digital processing system, generating a number of additional keys, each comprising a public key portion and a private key portion, authorizing each additional key using the root key producing a signature of the additional keys and associating entitlements with each additional key where each additional key may have a unique set of entitlements, the associated entitlements being within the entitlements associated with the first key, transferring the additional public key portions and the associated signature and a digital representation of the associated entitlements to the digital processing system, authenticating the additional public key portions using the root public key portion and verifying that entitlements associated with each additional public key portions are within the entitlements associated with the root public key portion.

A corresponding apparatus relates to a digital processing system adapted and configured for authenticating data by receiving a first, root public key portion and a digital representation of associated entitlements in the digital processing system, receiving a second public key portion and a digital representation of associated entitlements and an associated digital signature in the digital processing system, authenticating the second public key portion and its associated entitlements using the root public key portion and verifying that entitlements associated with the second public key portion are within the entitlements associated with the root public key portion, and authenticating each additional public key and entitlements in a manner similar to that described for the second public key.

The method may also comprise the steps of generating a plurality of root keys each comprising a public key portion and a private key portion, transferring each root public key portion and a digital representation of the associated entitlements to the digital processing system, generating a number of additional keys, each comprising a public key portion and a private key portion, authorizing each additional key using the one of the root keys producing a signature of the additional keys and associating entitlements with each additional key where each additional key may have a unique set of entitlements, the associated entitlements being within the entitlements associated with the authenticating root key, transferring the additional public key portions and the associated signature and a digital representation of the associated entitlements to the digital processing system, authenticating the additional public key portions using the appropriate root public key portion and verifying that entitlements associated with each additional public key portions are within the entitlements associated with the authenticating root public key portion.

BRIEF DESCRIPTION OF THE DRAWING

FIG. 1 depicts a block schematic illustrating the embodiment

DETAILED DESCRIPTION OF THE INVENTION

The present invention will now be described in detail with reference to a few preferred embodiments thereof as illustrated in the accompanying drawing. In the following description, numerous specific details are set forth in order to provide a thorough understanding of the present invention. It will be apparent, however, to one skilled in the art, that the present invention may be practiced without some or all of these specific details. In other instances, well known processes and steps have not been described in detail in order not to unnecessarily obscure the present invention.

According to an embodiment, the proposed solution uses asymmetric encryption procedures for signing and verifying signatures, for example such as the RSA algorithm or elliptic curve cryptography (ECC).

FIG. 1 depicts an embodiment 100, wherein a first authority 110, a second authority 120 and a third authority 130 may sign data for a digital processing system 140. The first and second authorities, 110 and 120 are both root authorities. The root authorities are those that can authorize data or other subsidiary authorities, and which are the first elements in a chain of authorities wherein one authority may sign another. DPS 140 contains non-volatile memory 142 to store the root keys of each root authority, and their associated entitlements. The root public keys are programmed with the entitlements of the root authorities at manufacturing time into non-volatile memory, and are used to verify further keys and data.

In one embodiment the memory 142 comprised in DPS 140 may be one-time programmable (OTP), such that data written to the memory cannot be amended. In another embodiment the memory may be mask programmed Read Only Memory (mask programmed ROM) for the root public key storage and one time programmable memory for entitlements. A mask programmed ROM for example may produced when producing the chip on substrate, wherein the memory cells cannot be written at all and the information, i.e. a public key and associated entitlements, cannot be modified at all.

Digital processing system (DPS) 140 in one example may be a settop box for processing a pay TV data stream, in particular a DPS integrated in a settop box forming the data processing unit. DPS 140 in this embodiment may comprise more than one CPU core, i.e. CPU-1, CPU-2 and CPU-3, such that data may be processed by CPU-1 or CPU-2 or CPU-3.

DPS 140 is adapted and configured to process data only when an associated authority authorizes the data and the authorization is successfully authenticated in the DPS, wherein different authorities may authorize processing of the data in different CPUs. Authentication of data for processing said data in the different domains may be performed within the DPS as described above. That is data to be processed is transferred to the DPS together with a digital signature of the data, wherein the signature is produced using a key identifying the competent authority.

DPS 140 may differentiate between data to be processed by one of the CPUs. In one example data may be assigned explicitly to one of the CPUs and must be authorized to be executed by this CPU. For example data may be assigned to be executed only on CPU-1, wherein CPU-1 may be a processor specialized for a specific purpose.

Furthermore DPS 140 may differentiate different types of data to be processed. In one example the DPS may differentiate between boot code for starting one or all of the CPUs and executable application code to be loaded and executed after one or all of the CPUs have booted and are in a status ready for loading and executing executable program code.

In this way the control of the DPS may be subdivided into more than one authorization domain, wherein different authorities may authorize the processing of data in one or more domains, wherein a domain may be characterized by processing a particular data type or by using a particular CPU or other suitable criteria. In the following description the processing of data on one CPU of DPS 140 is assumed to be one domain, such there is one domain for CPU-1, one for CPU-2 and one for data processing on CPU-3.

DPS 140 may be adapted and configured accordingly for differentiating entitlements for data processing in the different domains. For this purpose DPS 140 comprises a memory 141 in which for example public keys and associated entitlements may be stored. That is a public key associated with and identifying an authority is stored together with its associated entitlements in a memory. The software executed in the DPS checks entitlements of a key when authenticating the signature produced with said key. Processing of data is performed only if the signature and the entitlements of the signing key can be verified, i.e. authenticated successfully.

In the depicted embodiment authority 110 may be the manufacturer of DPS 140, which may have a pair of a public key 111 and a private key 112. Manufacturer 110 may have the entitlements to authorize data for processing data by CPU-1 and CPU-2 only. Public key 111 is stored in memory 142 of DPS 140 with these entitlements, wherein the associated entitlements are transferred in a digital representation to the DPS and the DPS accepts key 111 without any authentication or verification as a root key. DPS 140 may have a special routine for accepting a key without authentication or may accept a key if it is the first key transferred at all, or it may be programmed during DPS manufacture, thus key 111 serves for authenticating any data transferred to the DPS. Accordingly DPS 140 in this way is enabled to authenticate data for processing on CPU-1 or CPU-2 and authorized by authority 110.

Accordingly authority 1 may use its private key 112 for signing data 113 directly, which is then transferred together with the signature to DPS 140. When DPS 140 receives data 113 and the associated signature the data is authenticated successfully using public key 111 stored in memory 142 of the DPS.

Furthermore authority 110 may be granted the entitlement to pass all its entitlements of key pair 111, 112 to other keys, wherein also the entitlement to pass a given entitlement may be passed to a key. This entitlement to pass rights to other keys is also stored in non-volatile memory 142 of DPS 140 together with the key. Authority 110 may accordingly create a key pair comprising public key 114 and associated private key 115 to which the entitlement to authorize data for processing by CPU-1 is passed and to which the entitlement to pass that entitlement is passed, such that key pair 114, 115 is entitled to pass the entitlement for authorizing data for processing in CPU-1 to other keys.

The signed public key portion 114 is then transferred to DPS 140 together with its signature and its entitlements to authorize data and to pass its entitlements to other keys. Upon receipt of that key DPS 140 authenticates public key 114 by using public key 111 and by checking the entitlements given to key 111. In the authentication procedure the DPS will verify that the signature is valid, i.e. the signature for public key 114 has been produced with key pair 111, 112 and that the signing key pair 111, 112 has the entitlement to pass the entitlement for authorizing data for processing in CPU-1. As the authentication is successful public key 114 together with its entitlements is stored in DPS 140, wherein the key and its entitlements may be stored in one-time programmable memory or in volatile memory. If the key and its entitlements are stored in volatile memory, then the key and its entitlements will be stored in a manner that prevents modification without reverification. In one example the DPS may authenticate a key stored in less secure memory each time the key is used, such that the key or its entitlements cannot be amended. It is apparent that the signature covers the entitlements associated with the key, for example by calculating the signature on a concatenation of the key and the digital representation of the entitlements passed to the key.

Once public key 114 is authenticated by DPS 140 authority 1 can use it for authorizing, i.e. signing data 216, which is then transferred to and authenticated by DPS 140 for processing on CPU-1. In the authentication procedure of received data DPS 140 will at least authenticate that the signature received with data 115 actually was created using a key having the entitlement to authorize the data. The DPS will accordingly run through a list of stored public keys to find a matching key and will then check the entitlements of that key. In case DPS 140 does not find a suitable public key, i.e. no key in its key list can authenticate the signature, or the key does not have a suitable entitlement, then the DPS will act accordingly and may discard the data and create an error message or error log.

In case the authentication process of public key 114 reveals that either the signature is invalid, i.e. the signature of public 114 has not been created by key pair 111, 112, or the signing key did not have the entitlement to pass the entitlement to the public key in question, then said public key will be discarded. It is apparent that the DPS again may show some reaction, for example may display an error message or create an error log.

Authority 110 in this way may authorize and pass entitlements to keys, which then may authorize data or authorize and pass entitlements to other keys. Accordingly authority 110 is a first tier authority capable of instantiating a chain of keys in the DPS, wherein a key of a lower tier may pass entitlements and the entitlement to further pass the given entitlements to a key of the next higher tier, i.e. to a following key in the chain of keys.

In addition to first tier authority 110 the embodiment may comprise a second first tier authority 120 having a key pair of public key 121 and corresponding private key 122. Authority 120 is granted the entitlements of authorizing data for processing in CPU-1 and CPU-3 and furthermore the entitlements to authorize other keys and pass these entitlements to other keys. Public key 121 is transferred to DPS 140 to enable the authentication of authorized data and keys and is stored together with its entitlements to authorize data for CPU-1 and CPU-3 and the entitlement to pass these entitlements to other keys in memory 142 of DPS 140. Similar as for key 111 of authority 110 public key 121 is stored safely in DPS 140 without any authentication, i.e. first tier key 121 is stored as root key in the DPS.

Once public key 121 is transferred to DPS 140 authority 120 may use the key pair to sign and thus directly authorize data for processing by CPU-1 or CPU-3 or may create and authorize another key pair, which is then a key of a second tier. For example public key 123 and private key 124 are created as second tier key for authorizing data for processing in CPU-1, wherein the entitlement to pass its entitlement of authorizing data to other keys is granted to public key 123. Hence authority 120 may authorize data 125 for processing in CPU-1 using key pair 123, 124. Signed data 125 is then transferred to DPS 140, which will run through the list of public keys and will find matching public key 123, which is authenticated using public key 121.

In this way data for a particular domain, e.g. for CPU-1, within DPS 140 may be authorized by more than one authority. In other words any authority having a key for authorizing data for processing in a particular domain may authorize data for processing in that domain, such that there may be a crossover of entitlements. The key may be a first tier key or of a higher tier, wherein keys of a higher tier are authenticated using the signing key in a loop until a first tier key ends the loop of authenticating keys.

In the depicted embodiment 100 authority 130 may be a supplier of data to be processed by DPS 140, wherein authority 130 is not a first tier authority. In order to enable authority 130 to authorize data 133 for processing in CPU-1 of DPS 140, the corresponding entitlements must be passed to the key pair, i.e. public key 131 and private key 132. The necessary entitlements may be passed either by signing by first tier key pair 121, 122 or by signing using second tier key pair 123, 124 as depicted in the drawing. So public key 131 is transferred to authority 120 and signed by key pair 123, 124, whereby the entitlement to authorize data for processing in CPU-1 is passed to public key 131. Public key 131 thus forms a third key tier entitled to authorize data for processing in CPU-1.

In case that furthermore the entitlement to pass the given entitlement to other keys is granted to key 131, then key pair 131, 132 may be used to authorize other keys, i.e. keys of a fourth tier.

After public key 131 is signed it is transferred to DPS 140 together with its signature, which the digital processing system 140 will authenticate. For authenticating the key the DPS will run through the list of stored public keys and check if one of these can be used to validate the signature and the entitlements passed to the key, which will then be stored in memory 141 together with its entitlements.

The data supplier, i.e. authority 130, in this way may use its own key pair for authorizing data for processing by CPU-1 in DPS 140. Data produced for processing in CPU-1 may accordingly signed by data supplier 130 directly and may then be transferred to DPS 140. Furthermore, if the entitlement of passing the granted entitlement to other keys has been passed to key 131, then authority 130 may create further keys and may pass the entitlement to authorize data to these keys.

DPS 140 accordingly may store a list of public keys and their entitlements, which may be used to authenticate data for a particular domain and, in case the public key has the corresponding entitlement, may be used to authenticate other public keys. The public keys for example may be stored in memory 141 as exemplified in the table below. The "entitlements" are those passed to a key for authorizing data and the "signing entitlements" are a subset of the entitlements, which may be passed to other keys. In this embodiment a digital representation of the entitlements is stored in a byte, wherein the rightmost bit reflects the entitlement to authorize data for CPU-1, the next bit reflects the entitlement to authorize data for processing in CPU-2, the third bit is associated with CPU-3 and the remaining bits are "don't care" bits. In the following table a bit set to "1" represents that the entitlement is given, whereas a—means that the entitlement is not present in the key.

| Key Name | Entitlements | Signing Entitlements | Comment |
| --- | --- | --- | --- |
| 111, 112 | ------11 | -----11 | Root key of authority 110 |
| 114, 115 | -------1 | -------1 | Second tier key, signed by 111, 112 |
| 121, 122 | -----1-1 | -----1-1 | Root key of authority 120 |
| 123, 124 | -------1 | -------1 | Second tier key signed by 121/122 |
| 131, 132 | -------1 | -------1 | Third tier key signed by 123, 124 |

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed.

What we claim is:

1. A method, comprising:
   generating, by a first device, a first key pair comprising a first public key portion and a first private key portion;
   transferring, by the first device, the first public key portion to a second device having a second key pair, the second key pair comprising a second public key portion and a second private key portion, wherein the second key pair is associated with second entitlements comprising second data entitlements and second signing entitlements that are within the second data entitlements, and wherein the second device is configured to:
   authorize the first key pair by signing the first public key portion using the second private key portion to produce a first key signature of the first key pair,
   associate first entitlements with the first public key portion, the first entitlements comprising first data entitlements that are within the second signing entitlements and further comprising first signing entitlements that are within the first data entitlements, and
   transfer the first public key portion, the first key signature, and the first entitlements to a digital processing system, wherein upon receipt of the first public key portion, the first key signature, and the first entitlements, the digital processing system is configured to authenticate the first public key portion by using the first public key portion to verify that the first key signature was produced using the second key pair and by using the second entitlements to verify that the first data entitlements are within the second signing entitlements;

signing, by the first device, data with the first private key portion to generate a data signature; and sending, by the first device, the data and the data signature to the digital processing system, wherein receiving the data and the data signature causes the digital processing system to authenticate the data before processing the data by verifying that the data signature was produced using the first key pair and by verifying that the first entitlements include the first data entitlements for processing the data, and wherein failing to authenticate the data causes the digital processing system to reset to limited operations.

2. The method of claim 1, wherein the first data entitlements comprise an entitlement to authorize the data for processing by one or more elements in the digital processing system or an entitlement to authorize a type of data processing by the one or more elements in the digital processing system.

3. The method of claim 1, wherein the second public key portion is a first tier public key, and wherein the second public key portion is transferred to the digital processing system and accepted by the digital processing system without authentication.

4. The method of claim 1, wherein the first key signature covers the first entitlements associated with the first key pair.

5. The method of claim 1, wherein a digital representation of the first entitlements is stored in a one-time programmable memory comprised in the digital processing system.

6. The method of claim 1, wherein the second public key portion and a digital representation of the second entitlements are stored in a one-time programmable memory comprised in the digital processing system.

7. The method of claim 1, wherein the first public key portion is stored in a mask programmed ROM and a digital representation of the first entitlements is stored in a one-time programmable memory comprised in the digital processing system.

8. The method of claim 1, wherein the first public key portion, the first entitlements, and the first key signature are stored in a memory comprised in the digital processing system, and wherein the first public key portion and the second entitlements are authenticated each time the first key pair is used.

9. The method of claim 1, wherein the digital processing system comprises at least two authorization domains.

10. The method of claim 9, wherein there are at least two root/first tier keys, each having an entitlement for authorizing the data for processing in the same domain.

11. The method of claim 10, wherein each of the at least two root/first tier keys has different entitlements for authorizing the data for processing in the same domain.

12. The method of claim 10, wherein each of the at least two root/first tier keys has entitlements for authorizing the data stored in a separate non-volatile memory.

13. The method of claim 1, further comprising:
receiving, by the first device, the first entitlements from the second device, wherein the first entitlements enable the first device to use the first key pair to authorize a third key pair for authorizing the data to be processed at the digital processing system.

14. A digital processing system, comprising:
a memory;
a processor coupled to the memory, the processor configured to:
receive, from a device having a second key pair comprising a second public key portion and a second private key portion, the second public key portion and second entitlements associated with the second public key portion, wherein the second entitlements comprise second data entitlements and second signing entitlements that are within the second data entitlements, and wherein the device having the second key pair is configured to receive a first public key portion from a device having a first key pair comprising the first public key portion and a first private key portion, receive, from the device having the second key pair, the first public key portion, first entitlements associated with the first public key portion, and a first key signature associated with the first public key portion, wherein the first key signature was produced by the device having the second key pair when signing the first public key portion using the second private key portion to authorized the first key pair, and wherein the first entitlements comprise first data entitlements that are within the second signing entitlements and further comprise first signing entitlements that are within the first data entitlements, store the first and second public key portions, the first and second entitlements, and the second key signature in the memory, authenticate the first public key portion by using the second public key portion to verify that the first key pair signature was produced using the second key pair and by using the second entitlements to verify that the first data entitlements are within the second signing entitlements, receive, from the device having the first key pair, data and a data signature generated by signing the data with the first private key portion, authenticate the data before processing the data by verifying that the data signature was produced using the first key pair and by verifying that the first entitlements include the first data entitlements for processing the data; and reset the digital processing system to limited operations when failing to authenticate the data.

15. The digital processing system of claim 14, wherein the first data entitlements comprise an entitlement to authorize the data for processing by one or more elements in the digital processing system or an entitlement to authorize a type of data processing by the one or more elements in the digital processing system.

16. The digital processing system of claim 14, wherein the second public key portion is a first tier public key accepted by the digital processing system without authentication.

17. The digital processing system of claim 14, wherein the first key signature covers the first entitlements associated with the first key pair.

18. The digital processing system of claim 14, wherein the memory is a one-time programmable memory.

19. The digital processing system of claim 14, wherein the first public key portion, the first entitlements, and the first key signature are stored in the memory, and wherein the first public key portion and the first entitlements are authenticated each time the first key pair is used.

20. The digital processing system of claim 14, further comprising at least two authorization domains.

21. The digital processing system of claim 20, wherein there are at least two root/first tier keys, each having an entitlement for authorizing the data for processing in the same domain.

22. The system of claim 14, wherein the first entitlements received by the device having the first key pair enable the device having the first key pair to use the first key pair to authorize a third key pair for authorizing the data to be processed at the digital processing system.

23. A method, comprising:
receiving, by a digital processing system, from a device having a second key pair comprising a second public key portion and a second private key portion, the second public key portion and second entitlements associated with the second public key portion, wherein the second entitlements comprise second data entitlements and second signing entitlements that are within the second data entitlements, and wherein the device having the second key pair is configured to receive a first public key portion from a device having a first key pair comprising the first public key portion and a first private key portion;

receiving, by the digital processing system, from the device having the second key pair, the first public key portion, first entitlements associated with the first public key portion, and a first key signature associated with the first public key portion, wherein the first key signature was produced by the device having the second key pair when signing the first public key portion using the second private key portion to authorize the first key pair, and wherein the first entitlements comprise first data entitlements that are within the second signing entitlements and further comprise first signing entitlements that are within the first data entitlements;

authenticating, by the digital processing system, the first public key portion by using the second public key portion to verify that the first key signature was produced using the second key pair and by using the second entitlements to verify that the first data entitlements are within the second signing entitlements;

receiving, by the digital processing system, from the device having the first key pair, data and a data signature generated by signing the data with the first private key portion;

authenticating, by the digital processing system, the data before processing the data by verifying that the data signature was produced using the first key pair and by verifying that the first entitlements include the first data entitlements for processing the data; and resetting, by the digital processing system, the digital processing system to limited operations when failing to authenticate the data.

\* \* \* \* \*

UNITED STATES PATENT AND TRADEMARK OFFICE
CERTIFICATE OF CORRECTION

PATENT NO. : 9,246,687 B2
APPLICATION NO. : 12/038509
DATED : January 26, 2016
INVENTOR(S) : Andrew Dellow It is certified that error appears in the above-identified patent and that said Letters Patent is hereby corrected as shown below:

Claims

In column 10, line 23, claim 14, replace "authorized" with --authorize--.
In column 10, lines 32-33, claim 14, replace "first key pair signature" with --first key signature--.

Signed and Sealed this
Twenty-eighth Day of June, 2016

Michelle K. Lee
*Director of the United States Patent and Trademark Office*